United States Patent [19]

Müllenmeister

[11] Patent Number: 4,888,475
[45] Date of Patent: Dec. 19, 1989

[54] THERMALLY READABLE ENCODING AND ACTIVATION THEREOF

[75] Inventor: Thomas Müllenmeister, Grosshansdorf, Fed. Rep. of Germany

[73] Assignee: Gerhard Rosorius, Quickborn-Heide, Fed. Rep. of Germany

[21] Appl. No.: 55,835

[22] Filed: Jun. 1, 1987

[30] Foreign Application Priority Data

Jun. 18, 1986 [DE] Fed. Rep. of Germany ....... 3620369

[51] Int. Cl.⁴ .............................................. G06K 19/00
[52] U.S. Cl. ................................... 235/487; 235/439; 235/491; 365/148
[58] Field of Search ...................... 235/439, 487, 491; 365/148

[56] References Cited

U.S. PATENT DOCUMENTS 3,511,973  7/1970  Best ..................................... 235/439
3,573,438  4/1971  Rowen ............................... 365/148
3,959,630  5/1976  Hogberg ............................. 235/491
4,176,406 11/1979  Matkam .............................. 365/148
4,724,309  2/1988  Greene ............................... 235/491

FOREIGN PATENT DOCUMENTS 7935267  8/1980  Fed. Rep. of Germany .
1516832  5/1978  United Kingdom .

Primary Examiner—A. D. Pellinen
Assistant Examiner—Jeffrey A. Gaffin
Attorney, Agent, or Firm—Walter C. Farley

[57] ABSTRACT

A thermally readable encoding arrangement can be scanned with a temperature radiation sensor. The encoding arrangement has alternating regions which differ in thermal conductivity, capacity or emissivity characteristics. Heat is either supplied or withdrawn from the encoded region after which the region is sequentially scanned along a path using a radiation detector to evaluate the temperature differences which arise because of the characteristics. Various forms of temperature activation and encoding structures are disclosed.

22 Claims, 4 Drawing Sheets

THERMALLY READABLE ENCODING AND ACTIVATION THEREOF

This invention relates to a structure which includes a thermally readable arrangement of markings which can be regarded as a coding arrangement, and also to a method and apparatus for supplying or extracting heat to cause temperature activation of the coding arrangement.

BACKGROUND OF THE INVENTION

It is possible to arrange surface characteristics or markings on a body such that they form a pattern which contains information, such as the identification of the body itself, and so that the pattern can be read with suitable detection equipment. The arrangement of markings or characterizations can be regarded, in a broad sense, as an encoding technique. Thermally readable codes of this type have been readable only with difficulty and with correspondingly expensive apparatus. They have the advantage that they can be arranged so that the coded portions of the surface or body do not differ from the surrounding surface in the visible region of the spectrum and are therefore, for all practical purposes, invisible.

Such surface encoding is thus quite secure against fraud and, because of the expense of the apparatus for reading, can also be regarded as being relatively secure against unauthorized reading. Prior art devices are, however, only manufacturable at considerable expense.

A thermally readable recording technique is shown in U.S. Pat. No. 3,511,973 in which a recording medium, normally having a substantially uniform resistivity, is altered in a pattern of selected, relatively small areas so that those areas have different resistivities. When a current is applied to the medium, the areas of differing resistance exhibit different losses from the remainder of the medium and, therefore, reach different temperatures which can be scanned to determine the pattern using suitable detector means.

This technique is quite limited in its field of use because electrical contacts must be provided on the surface and those contacts must be connected to a current source in order for the temperature differences to be made detectable. The fact that the electrical contacts would likely be visible and conspicuous impedes secret characterization. Because of the necessity of connection to a current source, reading is limited substantially to stationary reading devices. These are significant disadvantages.

SUMMARY OF THE INVENTION

An object of the present invention is to provide a thermally readable surface encoding arrangement which can be made so that it is not visually detectable.

A further object is to provide such an apparatus in which the supply or extraction of heat to activate the encoding can be accomplished in a particularly simple fashion.

Yet another object is to provide an encoding arrangement which is extremely simple and inexpensive to produce and which is highly portable, having no limitations as to the location or environment in which it is activated and read.

Yet another object is to provide such an encoding apparatus which can be read using simple and inexpensively produced detector means.

A still further object is to provide a method of encoding, activating and reading a structure.

Briefly described, the invention includes a thermally encoded device comprising a body of material having a first thermal conductivity, means along a path in the body defining a plurality of spaced regions having a second thermal conductivity significantly different from the first thermal conductivity so that the path traverses regions having, alternatingly, said first and second thermal conductivities, means for applying to at least part of the body along the path a heat sink or heat source, and means movable relative to the path for detecting temperature differences between the regions.

In another aspect, the invention comprises a method of activating and reading a thermally encoded structure in which a body of material having a first thermal conductivity is provided with regions therein having a different thermal conductivity, the method including the steps of applying a heat sink or heat source to the body over an area encompassing regions of both of the thermal conductivities, and exposing a heat detector sequentially to the various regions to detect temperature differences therebetween.

A still further aspect of the invention includes a method of forming and reading an encoded device comprising the steps of forming a body of material having a first thermal conductivity, embedding in the body a plurality of members having a second thermal conductivity which is significantly different from the first thermal conductivity, the members being arranged relative to the surface of the body in a pattern representative of identifiable information, exposing either a heat source of heat sink to the surface of the body, and determining the resulting pattern of temperature differences at the surface to thereby identify the information.

BRIEF DESCRIPTION OF THE DRAWINGS

In order to impart full understanding of the manner in which these and other objectives are attained in accordance with the invention, particularly advantageous embodiments thereof will be described with reference to the accompanying drawings, which form a part of this specification, and wherein.

DESCRIPTION OF THE PREFERRED EMBODIMENTS

The surface characterization or encoding in accordance with the invention is subject to thermal treatment in substantially any desired manner, as will be described in more detail below, which is substantially simpler than prior art structures and which can be used with a completely inconspicuous and optically neutral construction of the encoded body. The marked and unmarked regions need only differ from one another in that they exhibit different changes of temperature after subjection to a uniform thermal treatment, which differences can be scanned to detect the existence of the pattern built into the body. This different behavior can be achieved in various ways as will now be described.

Figure 1:
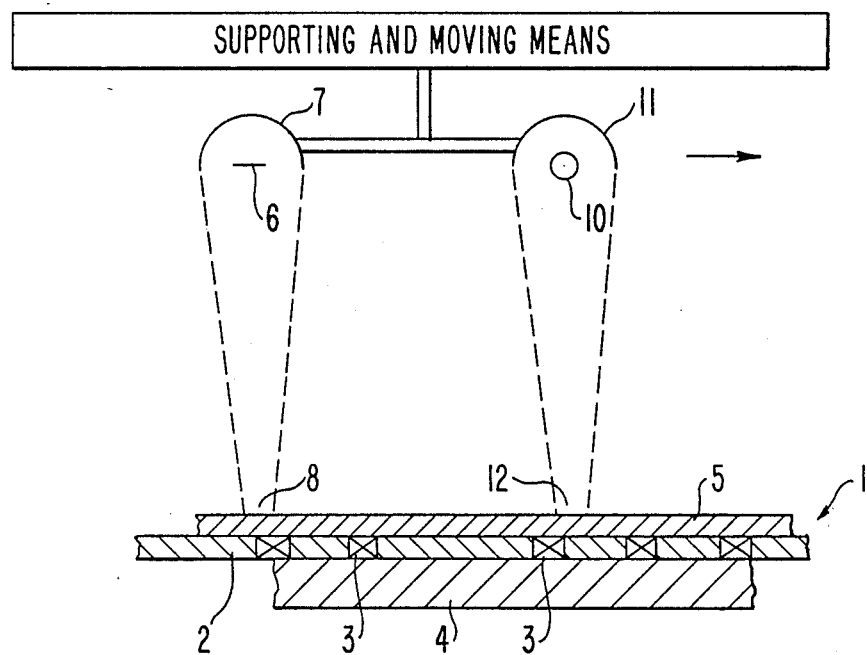
FIG. 1 is a schematic side elevation of a structure in accordance with the invention showing a technique for temperature-activating the encoded pattern therein and for reading the pattern.
Figure 2:
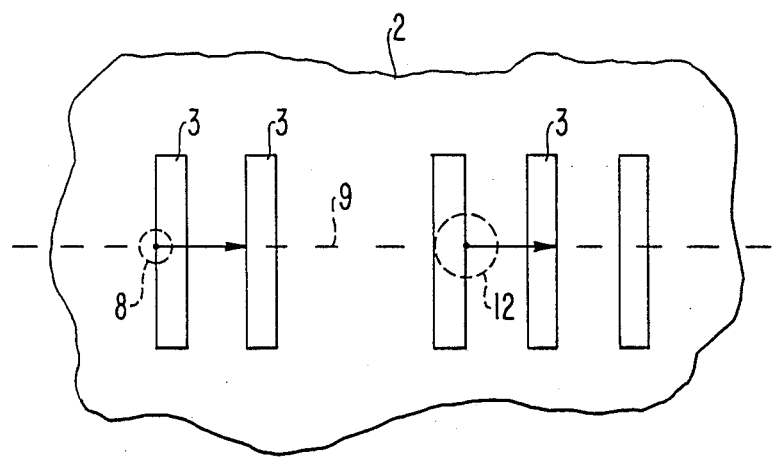
FIG. 2 shows a partial top plan view of the structure of FIG. 1.

FIG. 1 shows an encoded body indicated generally at 1 which includes a layer 2 of plastic material, having a relatively low thermal conductivity, with elongated metal strips 3 embedded therein. The metal strips 3 are spaced apart to form a simple pattern, visible in FIG. 2, which constitutes the encoding. While the pattern illustrated in FIGS. 1 and 2 is extremely simple, the principle will be evident therefrom. In the direction transverse to the long dimension of the strips 3, a coding pattern is produced by the successively different spacings, which coding is machine readable and which can be converted into a number in a manner well-known from optically readable bar codes on packaging of all types.

The encoding illustrated in the structure 1 can be applied to the surface of an article 4 which is to be identified or about which other information is to be stored in the coding. The article 4 can be, for example, a credit card or the like with the identifying account number permanently stored in the code formed by the pattern of embedded strips 3. Other articles of substantially any type can also be characterized with encoding in this manner. For example, the body work of a motor vehicle, a television set, milk cartons or substantially any other article can be provided with such a layer which can be of minimal thickness.

As illustrated in FIG. 1, a cover layer 5 can be applied over the encoded layer, layer 5 being characterized by the minimum thermal conductivity and can be, for example, a synthetic resin lacquer which is substantially opaque in the optically visible range and thus optically covers the regions 2 and 3 which would be readable with the eye in the uncovered state.

In accordance with the broad aspects of the present invention, temperature scanning can be used to read the code. For this purpose, a temperature sensor 6 is provided which has a field of view which is relatively small and is illustrated in FIGS. 1 and 2 by a small circular region 8 on the surface, the field of view being determined by a reflector 7. Thus, infrared energy from region 8 is reflected by reflector 7 onto sensor 6. This scanner is moved in the direction of the arrow transverse to the longer dimension of metal strips 3, along the coding direction which is defined by a scanning path 9. It will be observed that the scanning does not involve any contact with the surface in this embodiment.

If the encoded surface illustrated in FIGS. 1 and 2 is in thermal equilibrium, the regions of different thermal conductivity have the same temperature and the scanner recognizes nothing. It is therefore necessary to temperature-activate the encoded surface.

In the embodiment of FIG. 1, the temperature activation is accomplished by a radiation source 10 such as a glow lamp or incandescent lamp which has a reflector 11 to produce a radiation spot 12 on the surface. The radiation spot 12 proceeds along the scanning path 9. Radiation source 10 and scanner 6 are rigidly coupled together so that the scanning point 8 follows along the scanning path 9 in the direction of the arrow at a fixed distance behind radiation spot 12. Point 8 thus traverses surface regions which were previously warmed by the radiation source.

At a constant speed of movement, surface regions above metal strips 3 are supplied with the same quantities of heat as the intervening regions consisting only of plastic. At those locations where metal strips 3 are present, heat is rapidly transported away laterally from the heated region because of the higher thermal conductivity of the metal strips, i.e., faster than the heat can flow away through the plastic material, which has a significantly lower thermal conductivity, in the intermediate regions.

Because of this thermal conductivity the surface regions of the cover layer 5 above the metal strips 3 are cooler than those above the intermediate regions. Different surface temperatures thus result which render the code thermally readable. Commercially available sensors 6 which are responsive to the range of thermal radiation, i.e., infrared electromagnetic waves with a wavelength in the range between about 1 micron and 14 microns and in the range of room temperature, can detect small surface temperature differences of, for example, a few tenths of a degree, are suitable as temperature sensor 6. So-called thermopile detectors may be used for this purpose.

It should be pointed out that the encoding and the scanning are not limited to a linear path 9. It will be apparent that more complex, two-dimensional surface patterns can be evaluated quite easily by multi-track scanning, and non-linear paths can also be employed.

Figure 3:
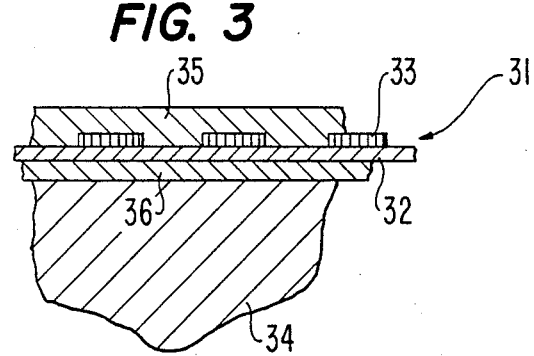
FIGS. 3-6 are sectional side elevations, respectively, of four alternative embodiments of an encoded structure in accordance with the invention.

FIG. 3 shows a different embodiment of the encoded body 31 which comprises a plastic film 32 with thin metal film strips 33 vapor-deposited on one surface in a pattern of choice such as the one shown in FIG. 2. In this embodiment, the identification of an article 34 is described which can, for example, be a larger metal workpiece such as a portion of a motor block or the body of a vehicle. The vapor deposited film 32, which can be made in the manner of a conventional adhesive label, is adhered to a priming color layer 36 which covers the article 34, the label being covered in turn by a further cover layer 35 which protects it from the exterior and renders it optically unrecognizable. The cover layer 35 can comprise, for example, the body work paint or lacquer conventionally used.

The temperature activation and scanning can be accomplished in accordance with the apparatus illustrated in FIG. 1 wherein the differences in temperature, resulting from the differences in thermal conductivity because of the strips 33 of metal film are activated and then detected.

Figure 4:
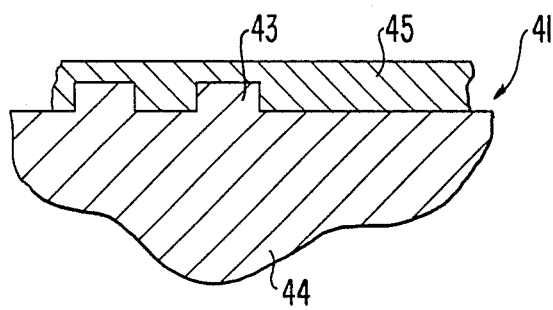

FIG. 4 shows a further embodiment in which raised surface markings 43 are provided on the surface of a larger article 44. These are covered so as to render them invisible by a cover layer 45 having a smooth outer surface which fills the recesses between the raised markings. On temperature activation as described in accordance with FIG. 1, differences in temperature are produced due to the fact that when the cover layer 45 is warmed, the heat is conducted more rapidly into article 44 from the layer areas above markings 43 by reason of the reduced layer thickness than into the intermediate regions above the recesses. Scannable differences in temperature thus result on the surface of the cover layer 45. It will be recognised, of course, that after a suitable interval of time, the temperature differences disappear as the article reaches thermal equilibrium. However, the temperature differences remain sufficiently long to permit detection as described above.

Figure 5:
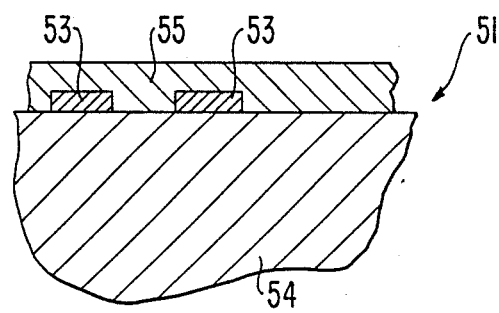

FIG. 5 shows a further embodiment in which metal strips 53 are directly applied to the surface of an article 54 and are covered with a cover layer 55. Depending upon whether the article 54 is a good or poor thermal conductor, the temperature activation effect as explained in connection with FIGS. 3 and 4 is achieved to a greater or lesser degree.

Figure 6:
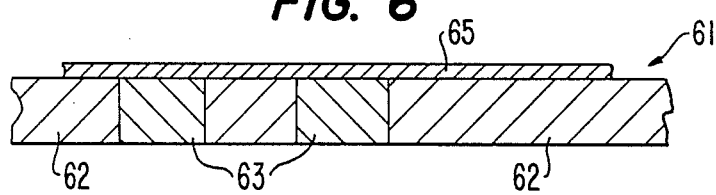
Figure 7:
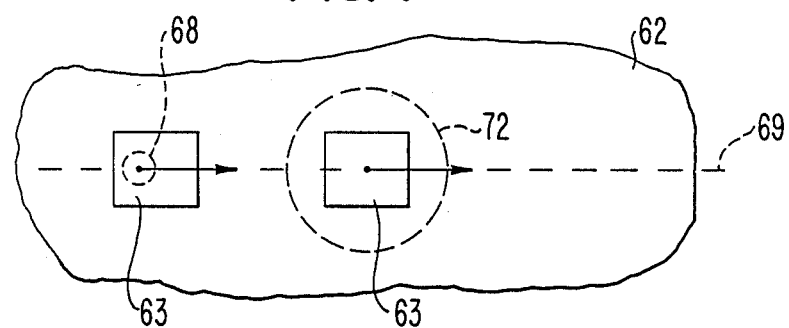
FIG. 7 is a plan view of the structure of FIG. 6.

FIGS. 6 and 7 show in section and in plan view, respectively, an encoding arrangement which is constructed as a point characterization extending in the direction of a scanning path 69. In this embodiment, the encoding points are constructed as metal members 63 of rectangular shape which are embedded in a plastic layer 62 and are covered by a cover layer 65. This arrangement can be applied, as in the previous embodiments, to an article to be identified or otherwise marked, the article being omitted for simplicity.

Temperature activation and scanning can be accomplished with a device of the type shown in FIG. 1. The scanning point 68 is again maintained quite small.

The radiation point 72 is, however, substantially larger than in the embodiment of FIGS. 1 and 2 and completely covers the entire surface of each embedded member 63 as it passes. The metal members 63 are thus uniformly warmed over their entire surfaces.

Thus, in this embodiment, thermal conduction effects in the direction parallel with the surface cannot be made use of. However, two effects can be utilized in order to achieve scannable differences in temperature. First, the different thermal conductivities transverse to the surface can be made use of, that is to say, perpendicular to the exposed surface of cover layer 65. Heat is conducted away downwardly more rapidly from the warmed surface regions of the cover layer 65 above a metal portion 63 than in the intervening regions 62. Above the metal members the surface thus cools more quickly so that the scanning point 68 which follows later in time sees differing surface temperatures. The prerequisite is that the underlying material, i.e., the article to which this arrangement is applied, be a good thermal conductor.

If the arrangement illustrated in FIGS. 6 and 7 is disposed freely in the air or is arranged on a poor thermal conductor, the temperature differences nevertheless occur. The plastic material of layer 62 has substantially smaller thermal capacity than the metal of metal member 63. If an amount of heat of the same magnitude per unit surface area is applied, the metal and plastic consequently reach different temperatures. This effect is independent of thermal conduction processes. The thermal conduction effect and thermal capacity effect generally appear in combination, and contribute even in the embodiments illustrated in the preceding figures.

With regard to the example of FIG. 6, it should also be explained that the effects function even without a cover layer 65 and, in fact, generally are even better. The surface characterization is, however, then generally optically readable from the exterior which militates against usage as a secret identification. Optically visible differences between encoded and non-encoded regions can only be avoided in a different manner than with a cover layer, for example, by using materials of very similar appearance which differ in their thermal conduction and/or thermal capacity characteristics. For this purpose, ceramics of different composition but of the same appearance can be used.

Figure 8:
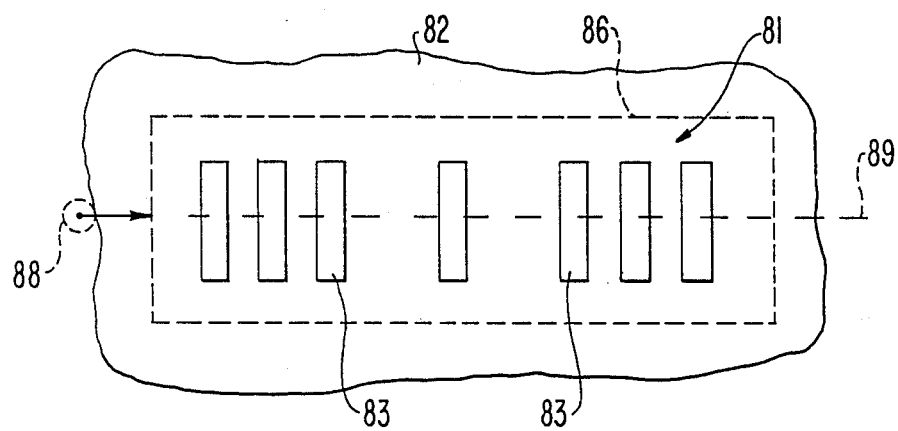
FIGS. 8 and 9 are top plan and sectional side elevations, respectively, of an embodiment in which contact heating is employed for activation.
Figure 9:
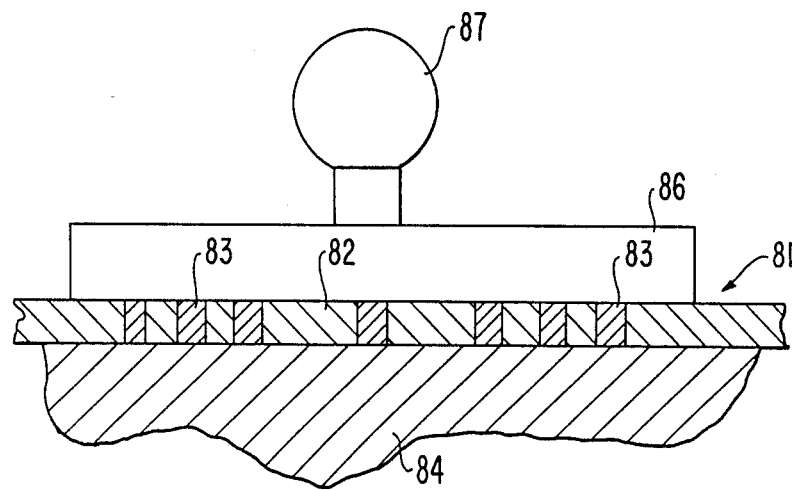

In FIGS. 8 and 9 a surface encoding arrangement is schematically illustrated as including only a plastic layer 82 with embedded strips 83. This embodiment is employed to illustrate a different temperature activation method which can be used as an alternative to the radiation warming of the embodiment of FIG. 1. In this embodiment, a heating body is used which is constructed in the form of a stamp with a heavy heatstoring plate 86 and with a hand grip 87. Plate 86 is initially heated to a high temperature, for example, in an oven. The surface is then brought into contact with the surface of the encoded body in the location illustrated by the dashed lines in FIG. 8. On contact with the surface of encoded body 81, heat is introduced into the structure. After a short interval of contact, the stamp is removed. A reading can then be taken in the direction of the arrow along path 89 with a scanning detector 88. As with the previous embodiments, the metal and non-metal portions exhibit different temperatures which can be detected by the scanning. If the surface encoding 81 is disposed on a non-conducting object 84, differing thermal capacities of the plastic layer 82 and metal strips 83 result in differing surface temperatures. If object 84 is a good conductor, then heat conduction from the heated surface downwardly into the article is utilized.

In a modification to FIGS. 8 and 9, not illustrated, the stamp can be provided with a very narrow plate 86 which covers only a narrow strip along scanning path 89. In this case, the effect of the thermal conduction in the metal strips 83 in directions parallel with the surface is also used.

Figure 10:
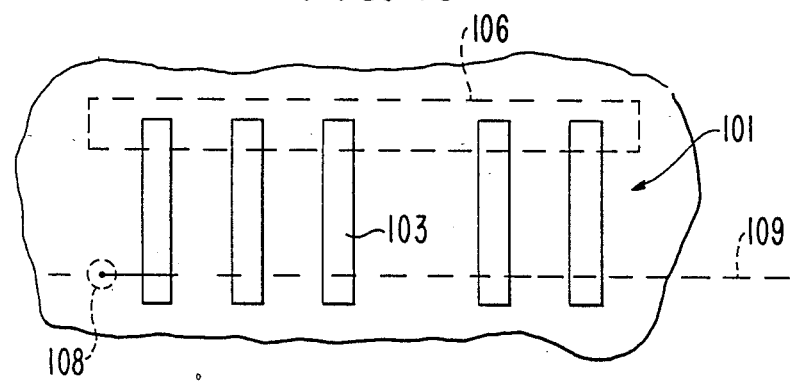
FIGS. 10-12 are top plan views similar to FIG. 8 illustrating alternative temperature activating techniques.

FIG. 10 shows a modification to the embodiment of FIGS. 8 and 9 in which a narrow stamp 106 is placed in contact with the surface of an encoded body 101, similar to that of FIGS. 8 and 9, in such a way that only an end of each metal strip is covered. The scanning point 108 is then moved along track 109 which extends along the other ends of the strips and sees different temperatures resulting from the conduction of heat by the strips to the opposite ends thereof more quickly than heat is conducted through the intervening relatively poor conduction regions.

The areas 86 and 106 which are to be warmed can also be warmed with a radiation source, instead of a warming stamp, either form of heat source being suitable so long as the irradiation or other member is appropriately shaped and sized. A suitable reflective surface in conjunction with the heat source of FIG. 1 can alter the pattern to suit the circumstances.

Figure 11:
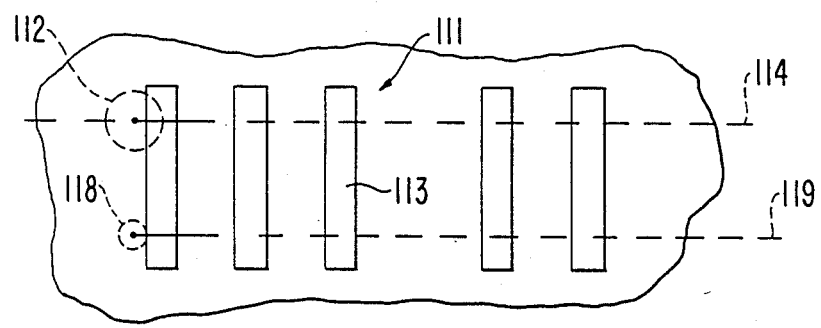

FIG. 11 shows a further modification in which the scanning path 119 for detector 118 extends over the encoded surface 111 having metal strips 113 in a manner similar to that of the embodiment of FIG. 10. The metal strips 113 are warmed, in this case by radiation, at the ends opposite the scanning rather than uniformly over the entire pattern. Rather, the radiation is in a form of a spot which is moved along path 114 parallel with the scanning point 118. The scanning and radiation devices of FIG. 1 can be used. However, in this embodiment, they are moved perpendicular to the direction shown in FIG. 1, i.e., the source and detector would be moved in a direction perpendicular to the plane of the drawing as shown in FIG. 1. The arrangement can also be such that in its movement the radiation spot 112 leads the scanning point 118 so that time elapses between radiation and detection, giving an opportunity for the heat to be conducted before detection occurs.

It should also be mentioned that the contact heat treatment with a stamp, describe with reference to FIGS. 8–10, can also be accomplished with a heat sink, i.e., a chilled plate, instead of with a hot plate. The heat flows and temperature differences occur in the opposite direction, but the end result is the same.

In all of the embodiments described above, importance must be placed on the fact that, within the meaning of the method in accordance with the invention, the temperature treatment which occurs by radiation or by contact warming or cooling, does not affect the scanning. A distinct separation is provided. Thus, in the example of FIGS. 8 and 9, the heat stamp is first brought into contact and scanning is then effected with temporal spacing. In the embodiment corresponding to that of FIG. 1, the warming occurs first and then the scanning subsequently. In the embodiment of FIG. 11, a spacial separation of the scanning and warming is provided.

The purpose of this separation of the heat treatment and scanning is to be sure that the heat treatment does not falsify the temperature determinations since if, in the example of FIG. 9, the scanning point 88 were to detect the warm plate 86 a false reading would results. Similarly, in the example of FIG. 1, if the scanning point 8 were to detect the radiation point 12 it would see reflected radiation or the hot surface momentarily independent of the substructure and also provide false results.

Figure 12:
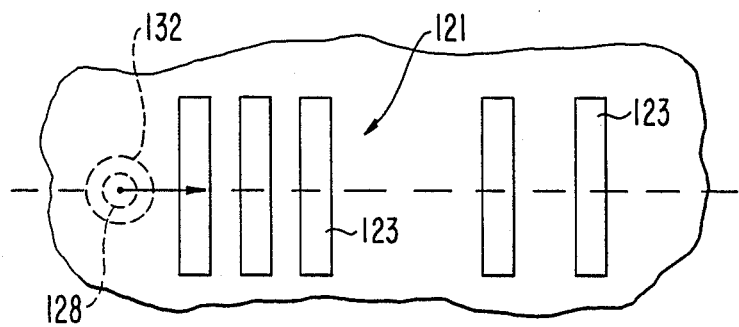

A modification of this separation of heat treatment or temperature activation and scanning is shown in FIG. 12.

In this embodiment, an encoded body 121 has metal strips 123 which are spaced in accordance with a predetermined code. The method proceeds with scanning and heat radiating devices corresponding to those of FIG. 1. However, in distinction from the embodiments previously described, the radiation point 132 and the scanning point 128 lie on top of one another. If one were to use the heat source described in connection with FIG. 1, that is to say a simple incandescent lamp, a measurement would not be possible since the radiation source is a broadband source which would radiate in the sensitivity range of the sensor 6 and the radiation reflected from the surface would overlap with the temperature radiation on the surface.

However, if one selects the components so that a spectral separation is achieved in which the radiation source radiates in a different range of wavelengths from that to which sensor 6 is sensitive, then the arrangement of FIG. 12 can be used. For example, the irradiation source can be an ultraviolet lamp which delivers no heat radiation, or from which infrared is appropriately filtered. The UV radiation is absorbed by the encoded surface and converted into heat which leads to differences in the surface temperature within the meaning of the temperature activation described above through the described affects, particularly heat conduction, and these differences can be recognized by scanning point 128.

In the above-described embodiments, thermal conduction and thermal capacity effects have been utilized for the temperature activation of regions having different thermal characteristics. In this connection, one must always be careful that the regions of different thermal conductivity are subjected to uniform thermal treatment for activation so that nonuniform thermal treatment does not falsify the detected values.

Figure 13:
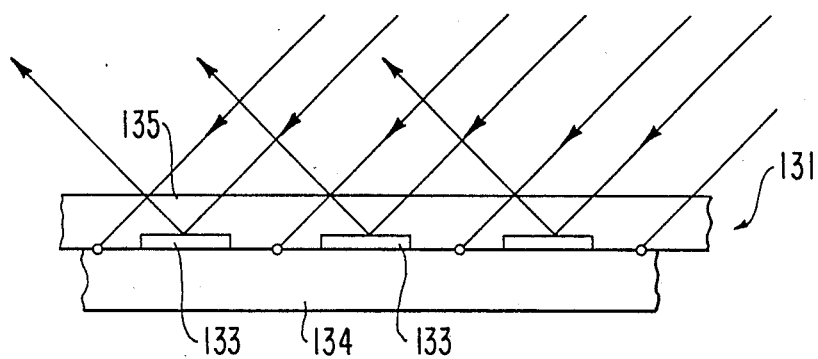
FIG. 13 is a side elevation, in section, through an encoded structure showing yet another temperature activating technique.

FIG. 13 shows a section through an encoded body 131 from which the section lines have been omitted so that they will not be confused with the diagonal lines illustrating radiation paths.

In this embodiment, metal strips 133 are applied to an object 134 and covered with a relatively low-conductivity cover layer 135. The construction corresponds substantially to that of FIG. 5. However, the cover layer 135 comprises a material which is translucent or transparent to a particular wave length with which the object is to be irradiated, such as ultraviolet light.

The incident ultraviolet radiation arrives obliquely from the upper right portion of the figure, in the direction of the arrows, and passes through cover layer 135 which is transparent in this range and is incident upon the surface of object 134 and is largely absorbed at that point as indicated by the small circles. The remainder of the radiation is incident upon the surface of metal strips 133 and most of it is reflected obliquely to the left in the direction of the arrows and thus leaves the structure.

Less heat is obviously introduced into the surface regions of the object 134 which are covered by the metal strips 133 than into the unprotected surface regions therebetween. Differences in temperature thus result which can be detected by scanning. In this embodiment, layer 135 is selected so that it is transparent or translucent to the ultraviolet radiation but is not transparent to visible light and thus renders possible the use of the surface coding in a secret fashion.

The temperature activation process described with reference to FIG. 3, based on differing absorption of irradiation, can also be attained with other constructions of the surface characteristics such as by means of stainings or the like of different absorptivity. This is particularly simple if the obscuring cover layer is omitted.

In the described embodiments of surface encoding a few simple materials are set forth which may be used, such as the material pair metal/plastic which is suitable for the present purposes by virtue of differing thermal conduction and thermal capacity characteristics. Various ceramics, which differ in these parameters, are also suggested. A large number of further materials may alternatively be used, the materials being selected for the purposes with regard to their characteristics. Merely as a further example, reference is made to light plastic materials with heavy metal pigments mixed therein of the types which are available as colored lacquers. The different regions of an encoded surface can comprise lacquer with differing pigment additions, the quantity of the pigment proportions influencing the thermal conductivity and thermal capacity.

In all of the embodiments of encoding described above, temperature activation is basically necessary since the surface temperature, which is variously determined by the temperature activation, must be scanned with a temperature sensor.

Figure 14:
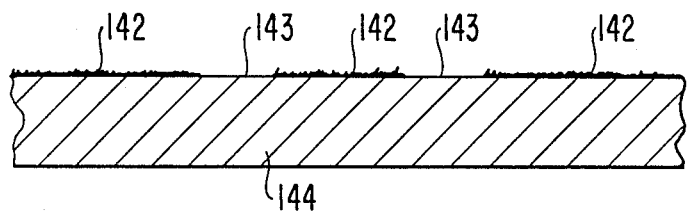
FIG. 14 is a still further embodiment of an encoded structure involving regions of differing emissivity.

The present invention is, however, not exclusively limited thereto but provides an alternative which will be explained with reference to FIG. 14.

In this figure is shown an object 144 which is coded on the surface which lies uppermost in the figure. The encoding is affected here in that regions 142 are rough and are separated by coding regions 143 which are polished. The uncoded and coded regions thus do not differ as to their materials but merely as to their surface configurations.

Regions 142 and 143 can also in other ways be rendered different as to their emissivities. Different materials can be used which differ in their emissivities. With different emissivities, and with a constant surface temperature across the surface, that is to say when the coded and uncoded regions have the same surface temperature, there is a difference in the thermal radiation by reason of the differing emissivity of these different regions, which radiation can be detected by the temperature sensor. In this embodiment, thermal activation may thus not be necessary. However, the scannability can be improved by thermal activation in the form of a uniform increase of the surface temperature since the radiation level then rises as a whole and the emission-determined differences become larger.

One might think of using a method of the type described in DE-GM No. 7935267 in which a coded surface region is subjected to infrared radiation and the reflected radiation is measured. The receiver could be constructed to be suitable for the measurement of surface temperatures. It has, however, been found that such a reflection measurement cannot determine the surface temperatures since the thermal radiation of the surfaces is very small in relation to the reflected radiation intensity in which the thermal radiation become swamped.

The method in accordance with the invention operates with a thermal treatment which occurs separately from the scanning. In this manner it is ensured that the thermal treatment does not influence the scanning sensor. Very small temperature differences between the marked and unmarked regions can thus be recognized.

Thermal activation using contact with a heating or cooling body is advantageous because such thermal treatment may be realized very simply. The heating or cooling body can, for instance, also be guided in rolling contact over a coded surface which can be of advantage, e.g., with longer code patterns.

As an alternative, radiation means can be advantageously provided. In this manner, the heat may be applied such that a very precise positional impingement may be achieved by virtue of suitable radiation focussing and diaphragm devices. In this manner a contactless measurement is possible which is very rapid of the radiation intensity is increased.

Whole-surface thermal treatment of the entire area of the characterization has the advantage that precise aiming is not necessary. However, by reason of the different reaction of the marked and unmarked regions, e.g., by means of differing thermal conduction into the support, for instance a larger characterized metal portion, the desired temperature differences may be achieved.

On the other hand, there is merit to the approach in which only the area of the scanning track is thermally treated. The different reaction effects of the coding, for instance by means of thermal conduction or thermal capacity, may thus be better exploited since the surface area adjacent to the thermally treated area remaining untreated and thus a temperature difference is produced which can be made use of.

With regard to the separation of the thermal treatment in the scanner which is to be provided in the method in accordance with the invention, temporal separation is advantageously used. In temporal separation, in which the scanning is spaced in time from the thermal treatment, an alternating influence is excluded in a simple manner.

Spatial separation can be achieved by effecting the thermal treatment at a different position to the scanning. For instance, simultaneously with the scanning, heat can be supplied from below to a surface-coded article while the scanning is effected from above.

When elongated markings form the code and are warmed at their one ends and conduct the heat to their other ends where the surface temperature is scanned, since the thermal conduction in the marked regions is different from that in the unmarked regions, temperature differences result. The thermally treated strip can be constantly thermally treated over its entire length. It is, however, also possible to move along this strip with a heating spot while the scanning scans the scanning path parallel thereto.

A further alternative for the separation is spectral separation. The heat can, for instance, be applied by ultraviolet radiation which is differently absorbed. The reflected UV radiation cannot have an influence by reason of the substantially differing spectral range of a temperature sensor which is not sensitive in this range. Closer radiation ranges, such as the near IR, may also be used with suitable construction of the device.

But it is also possible to use electromagnetic AC radiation of a lower frequency for inductive or capacitive heating of the surface characterization arrangement. With inductive heating those regions are heated which are better electrical conductors, e.g. metal strips, whereas intermediate plastic regions are not heated. When using the capacitive effect, the situation is reversed. Materials of lower electrical conductivity, e.g. plastic, because of their dielectric properties, are heated.

The shown surface marking arrangement 61 can be heated with inductive heating means, not shown, which essentially comprises an inductor connected to AC current. The inductor is positioned so that electromagnetic AC fields enter the encoded body and induce eddy currents within the metal pieces 63, leading to heating of the metal pieces whereas the plastic 62 remains cold. On the surface above the metal pieces 63 is a different temperature from the regions above plastic 62.

When using capacitive heating, the encoded arrangement 61 is arranged between the plates of a capacitor supplied with high frequency. Plastic 62 of the surface characterization arrangement 61 acts as the dielectric of the capacitor and is therefore heated by the dielectric losses when high frequency is applied, the metal pieces 63 remaining cold.

In case of inductive or capacitive heating, scanning is possible simultaneously because the heat treatment (inductive or capacitive) is well separated from the scanning and does not influence it.

According to the invention it is also possible to accomplish scanning and thermal treatment simultaneously. To do this, heat has to be supplied uniformly to the surface of the surface encoding arrangement. For this purpose, an object lying under the surface marking arrangement can be heated or cooled so that there is a temperature difference with respect to the surrounding atmosphere flowing by the outer surface of the surface characterization arrangement. Because of the different thermal conductivity of the marked and unmarked regions, there are resulting different surface temperatures which can be scanned. Such a process is advantageously used with marked objects which, for other reasons, are heated or cooled anyway, e.g. heating or cooling elements or objects which are just leaving an oven and then are thermally scanned.

In this process the surface encoding arrangement 31, 41, 51 is subjected to a thermal difference between its under and upper surfaces. E.g. the object 34, 44, 54 to which the surface characterization arrangement is attached, is heated and therefore has a higher temperature than the atmosphere passing by the upper surface of the surface characterization arrangement. A thermal flow results from this gradient in an orientation perpendicular to the plane of the encoded arrangement. The thermal resistance of the encoded arrangement is lower in regions where metal pieces 33, 43, 53 are embedded, having better thermal conductivity. In such regions the outer surface of the surface characterization arrangement has higher temperatures.

The reverse effect results from keeping the object 34, 44, 54 at lower temperatures with respect to the surrounding atmosphere, e.g. by appropriate cooling.

This form of heat treatment advantageously is used if the surface encoding arrangement 31, 41, 51 is attached to objects 34, 44, 54 which for other reasons are kept on different temperature anyway. E.g., this way of heat treatment is used where heated objects are leaving an oven at higher temperature and are moved through cool air. Other applications are on heating elements, hot or cold tubes, motors, etc.

A modification of this method is discussed with respect to FIG. 3. On a metal object 34 is arranged an insulating layer 36 and thereon a heating layer 32. Thereon the surface encoding arrangement 31 is arranged in form of metal strips 33. The arrangement is covered by plastic 35.

The heating layer 32 e.g. may be made from electric resistor material being heated by electric current. A heat flow results from the heated layer 32 to the upper outer surface of the surface encoding arrangement. In the regions of the metal strips 33 heat is transported better to the outside than at the regions of the plastic lying between the metal strips. The outer surface of the surface encoding arrangement is therefore warmer above the metal strips 33 than in the regions between, in which only plastic is arranged having a lower thermal conductivity.

While certain advantageous embodiments have been chosen to illustrate the invention, it will be understood by those skilled in the art that various changes and modifications can be made therein without departing from the scope of the invention as defined in the appended claims.

What is claimed is:

1. A thermally encoded and read apparatus comprising
a body of material having a first thermal conductivity;
means along a path in said body defining a plurality of spaced regions having a second thermal conductivity significantly different from said first thermal conductivity so that said path traverses regions having both of said first and second thermal conductivities;
means for substantially uniformly applying to at least part of said body along said path one of a heat sink and source and subsequently removing said sink or source;
means movable relative to said path for detecting temperature differences between said regions; and
a covering layer which is substantially opaque in the visible spectrum.

2. Apparatus including a thermally encoded article and means for reading the encoded article comprising
means defining marked regions which are separated by unmarked regions to define a code pattern, said marked and unmarked regions having different thermal response characteristics;
means for substantially uniformly supplying heat to, or extracting heat from, marked and unmarked regions on said article for a limited interval of time;
means for detecting the different thermal responses of said marked and unmarked regions to thereby determine the pattern of said code; and
a layer covering the marked regions which is substantially opaque in the visible spectrum.

3. An article according to claim 2 wherein said regions differ in their thermal conductivities.

4. An article according to claim 2 wherein said regions differ in their thermal capacities.

5. An article according to claim 2 wherein said regions differ in their reflectivities.

6. An article according to claim 2 wherein said article comprises a sheet of plastic material of low thermal conductivity having spaced regions of high thermal conductivity metal strips thereon.

7. An article according to claim 2 which further includes a covering layer which is substantially opaque in the visible spectrum.

8. An apparatus according to claim 2 wherein said means for uniformly applying heat comprises a source of radiant energy having means for focusing said energy on a desired portion of said pattern.

9. An apparatus according to claim 8 and further including means for supporting and moving said source of radiant energy parallel with said pattern during said heating.

10. An apparatus according to claim 9 and further comprising means for supporting and moving said sensor parallel with said pattern and said source of radiant energy during scanning.

11. An apparatus according to claim 2 wherein said means for uniformly applying heat comprises a heated metal plate of high heat capacity.

12. A method of making an encoded device comprising the steps of
forming a body of a material having a first thermal conductivity,
attaching to said body a plurality of members having a second thermal conductivity which is significantly different from said first thermal conductivity, the members being arranged relative to a surface of the body in a pattern representative of identifiable information,
covering the body in the region of the plurality of members with a layer which is substantially opaque in the visible region;
substantially uniformly applying one of a heat source and sink to the surface of the body, and
determining the pattern of temperature differences at the surface to thereby identify the information.

13. A method of thermally activating and reading a pattern in an article of the type having a body of material having a first thermal characteristic and regions on said body having a second thermal characteristic, said regions being arranged in a pattern with respect to a surface of the article forming a code, and having a covering which is substantially opaque in the visible region of the spectrum over the coded region, the method comprising the steps of substantially uniformly heating or cooling a selected region of the surface for a predetermined interval of time, and separately scanning the pattern with a sensor responsive to the thermal characteristic to detect the pattern.

14. A method according to claim 13 wherein the selected region of the surface is uniformly heated or cooled by placing a heated or cooled body in contact with the surface.

15. A method according to claim 13 wherein the selected region of the surface is heated by exposing the surface to electromagnetic radiation.

16. A method according to claim 15 wherein the electromagnetic radiation to which the surface is exposed is at a first selected wavelength, and wherein the sensor with which the pattern is scanned is responsive to a range of wavelengths not including the first selected wavelength.

17. A method according to claim 13 wherein the selected region of the surface to be heated or cooled includes the entire area of the surface associated with the pattern.

18. A method according to claim 13 wherein the selected region of the surface consists of a narrow path traversing the pattern.

19. A method according to claim 13 wherein the scanning is temporally separated from the heating or cooling.

20. A method according to claim 13 wherein the scanning is spatially separated from the selected region which is heated or cooled.

21. A method according to claim 20 wherein the regions on said body having the second thermal characteristic comprise elongated strips of material having a thermal conductivity different from the body of material, said strips being disposed with their longer dimensions transverse to a line along the body, and wherein the selected region which is heated or cooled comprises a first path substantially parallel with the line, and the scanning is performed along a second path substantially parallel with and separated from the first path.

22. A method of activating and reading a thermally encoded structure in which a body of material having a first thermal conductivity is provided with regions therein having different thermal conductivities, and having a covering over the regions of first and second thermal conductivities, the cover being substantially opaque in visible portions of the spectrum, the method including the steps of applying a heat sink or heat source to the body substantially uniformly over an area encompassing regions of both of the thermal conductivities and subsequently removing said sink or source, and exposing a heat detector sequentially to the various regions to detect temperature differences therebetween.

* * * * *